United States Patent [19]

Kazami et al.

[11] 4,284,698

[45] Aug. 18, 1981

[54] LAYERED ELECTROPHOTOGRAPHIC PHOTOCONDUCTOR

[75] Inventors: Takeo Kazami, Numazu; Takamichi Enomoto, Shiroyama; Tatuya Kato, Numazu; Toshio Fukagai, Shizuoka, all of Japan

[73] Assignee: Ricoh Company, Ltd., Tokyo, Japan

[21] Appl. No.: 147,306

[22] Filed: May 6, 1980

[30] Foreign Application Priority Data

May 15, 1979 [JP] Japan .................................. 54/58696

[51] Int. Cl.³ .......................... G03G 5/06; G03G 5/10
[52] U.S. Cl. ....................................... 430/59; 430/58; 430/76
[58] Field of Search ....................... 430/57, 58, 76, 77, 430/78, 59

[56] References Cited

U.S. PATENT DOCUMENTS

| | | | |
|---|---|---|---|
| 3,775,105 | 11/1973 | Kukla | 430/82 |
| 3,898,084 | 8/1975 | Champ et al. | 430/76 |
| 3,977,870 | 8/1976 | Rochlitz | 430/58 |
| 4,018,606 | 4/1977 | Contois et al. | 430/73 |
| 4,026,704 | 5/1977 | Rochlitz et al. | 430/57 |
| 4,052,210 | 10/1977 | Hectors | 430/96 |

FOREIGN PATENT DOCUMENTS 51-94829  8/1976  Japan .......................................... 430/57

OTHER PUBLICATIONS

Journal of Applied Photographic Engineering, vol. 4, #3, 1978.

*Primary Examiner*—Richard L. Schilling
*Assistant Examiner*—John L. Goodrow
*Attorney, Agent, or Firm*—Oblon, Fisher, Spivak, McClelland & Maier

[57] ABSTRACT

A layered electrophotographic photoconductor comprising an electroconductive support material and a photoconductive double layer consisting of a charge generation layer comprising a disazo pigment and a charge transport layer comprising a charge transport material which is capable of forming a charge transport complex by reaction with 2,4,7-trinitro-9-fluorenone, the charge transport complex being characterized by the light energy value corresponding to the wavelength of its maximum visible spectral absorption being in the range of 1.6 to 2.1 eV.

8 Claims, No Drawings

LAYERED ELECTROPHOTOGRAPHIC PHOTOCONDUCTOR

BACKGROUND OF THE INVENTION

The present invention relates to a layered electrophotographic photoconductor comprising an electroconductive support material and a photoconductive double layer which consists of a charge generation layer and a charge transport layer. In particular, it is concerned with a layered electrophotographic photoconductor whose charge generation layer comprises a disazo pigment selected from the group consisting of the disazo pigments represented by the following general formula and whose charge transport layer contains a charge transport material selected by a particular method using a charge-transfer complex formed by a reaction of 2,4,7-trinitro-9-fluorenone with each charge transport material:

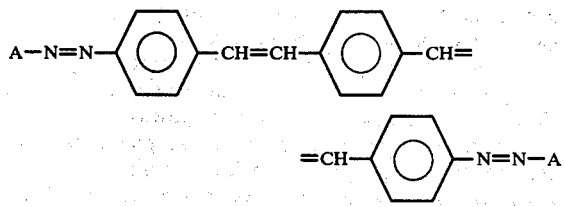

wherein A represents

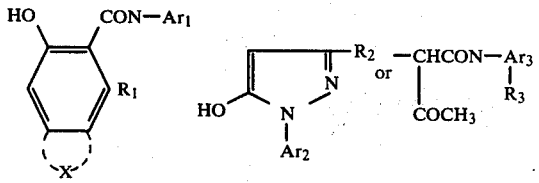

and X represents an aromatic ring, such as a benzene ring or a naphthalene ring; or a heterocyclic ring, such as an indole ring, a carbazole ring or a benzofuran ring or their substituted rings; $Ar_1$ represents an aromatic ring, such as a benzene ring or a naphthalene ring or their substituted rings; or a heterocyclic ring, such as a dibenzofuran ring or its substituted rings; $Ar_2$ and $Ar_3$ each represent an aromatic ring, such as a benzene ring or a naphthalene ring or their substituted rings; $R_1$ and $R_3$ each represent hydrogen, a lower alkyl group, a phenyl group or their substituted groups; and $R_2$ represents a lower alkyl group, a carboxyl group or its ester group.

PRIOR ART

U.S. Pat. No. 3,898,084 discloses the preparation of electrophotographic plates comprising certain selected disazo pigments. However, it does not suggest anything about charge transport materials to be used in the charge transport layer in combination with disazo pigments. It simply discloses certain selected disazo pigments which are effective charge generators.

Furthermore, no prior art reference of which we are aware suggests the use of disazo pigments in the charge generation layer in combination with certain charge transport materials, in the charge transport layer, selected by such a particular method as investigated by the inventors of the present invention.

SUMMARY OF THE INVENTION

It is therefore an object of the present invention to provide a layered electrophotographic photoconductor comprising an electroconductive support material and a photoconductive double layer consisting of a charge generation layer comprising a disazo pigment and a charge transport layer comprising a charge transport material, which has a high photoconductivity and a small dark decay without any build-up of residual surface potential when the photoconductor is repeatedly used, by selecting suitable charge transport materials for the charge transport layer.

To be more specific, in the present invention, in order to select charge transport materials suitable for use in the charge transport layer, each charge transport material is caused to react with 2,4,7-trinitro-9-fluorenone to form a charge transfer complex. The thus formed charge-transfer complex is subjected to a visible light absorption spectral analysis and the wavelength of its maximum spectral absorption is found. Then the light energy value corresponding to the wavelength of the maximum spectral absorption is determined and the light energy value of the maximum spectral absorption of the charge-transfer complex is in the range of 1.6 to 2.1 eV are used in the present invention.

Generally, as the photosensitivity of photoconductors that can be used in practice for electrophotography, it is required that the exposure $E_{\frac{1}{2}}$ (lux. second) which is required to reduce an initial surface potential Vo (Volt) to $\frac{1}{2}$ the initial surface potential Vo (Volt) be not greater than 2.5 lux seconds, and that $E_{1/10}$ which is required to reduce the initial surface potential Vo (Volt) to 1/10 the initial surface potential Vo (Volt) be not greater than 5.5 lux seconds.

According to the present invention, this requirement is completely satisfied.

Furthermore, in the layered electrophotographic photoconductor according to the present invention, since the increase of the residual potential while in use is extremely small, high quality copies with stable images can be obtained.

DETAILED DESCRIPTION OF THE PREFERRED EMBODIMENT

A layered electrophotographic photoconductor according to the present invention consists of an electroconductive support material and a photoconductive double layer consisting of a charge generation layer and a charge transport layer. The charge generation layer comprises a disazo pigment selected from the group consisting of the disazo pigments represented by the following general formula (1):

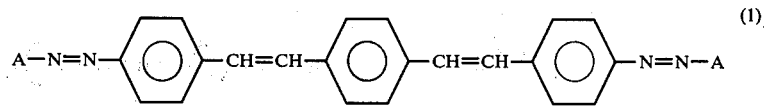

wherein A represents

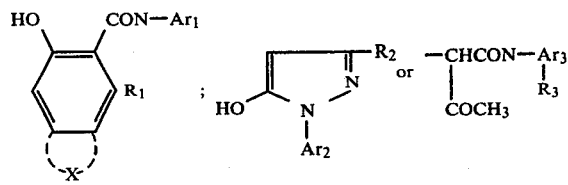

and X represents an aromatic ring, such as a benzene ring or a naphthalene ring; or a heterocyclic ring, such as an indole ring, a carbazole ring or a benzofuran ring or their substituted rings; $Ar_1$ represents an aromatic ring, such as a benzene ring or a naphthalene ring or their substituted rings; or a heterocyclic ring, such as dibenzofuran ring or its substituted rings; $Ar_2$ and $Ar_3$ each represent an aromatic ring, such as a benzene ring or a naphthalene ring or their substituted rings; $R_1$ and $R_2$ each represent hydrogen, a lower alkyl group, a phenyl group or their substituted groups; and $R_2$ represents a lower alkyl group, a carboxyl group or its ester group.

A charge transport material to be used in the charge transport layer is selected as follows: A charge transport material, which works as an electron donor, is caused to react with 2,4,7-trinitro-9-fluorenone, which works as a electron acceptor, whereby a charge-transfer complex is formed. The thus formed charge-transfer complex is subjected to a visible light absorption spectral analysis and the wavelength of its maximum spectral absorption is found. Then the light energy value corresponding to the wavelength of the maximum spectral absorption is determined and the light energy value of the maximum spectral absorption of the charge-transfer complex is in the range of 1.6 to 2.1 eV are selected for the present invention.

In the present invention, a charge generation layer containing a disazo pigment selected from the group consisting of disazo pigments represented by the general formula (1) is formed on an electroconductive support material and then a charge transport layer containing a charge transport material is formed on the charge generation layer.

As the electroconductive support material for use in the present invention, aluminum or a plastic film on which aluminum has been evaporated or coated, can be used. In these cases, it is unnecessary to dispose a blocking layer for preventing the injection of charges from the electroconductive support material to the charge generation layer, so that the charge generation layer can be disposed directly on the electroconductive support material. This is extremely advantageous in view of the production of the photoconductor.

Chrome, indium, nickel and other metals in general use can be used in the same manner as in the case of aluminum by disposing an ordinary blocking layer.

The specific examples of the disazo pigments to be used in the charge generation layer, which are represented by the previously mentioned general formula (1) are as follows:

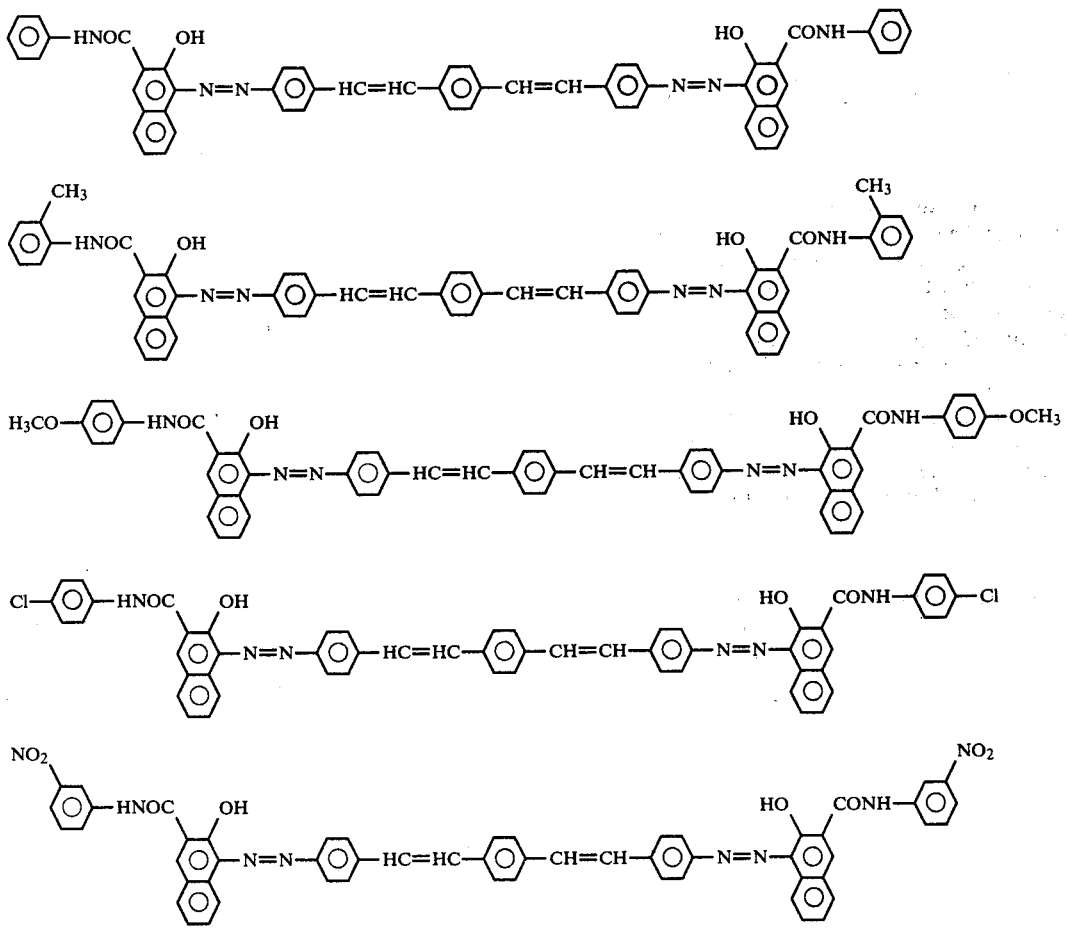

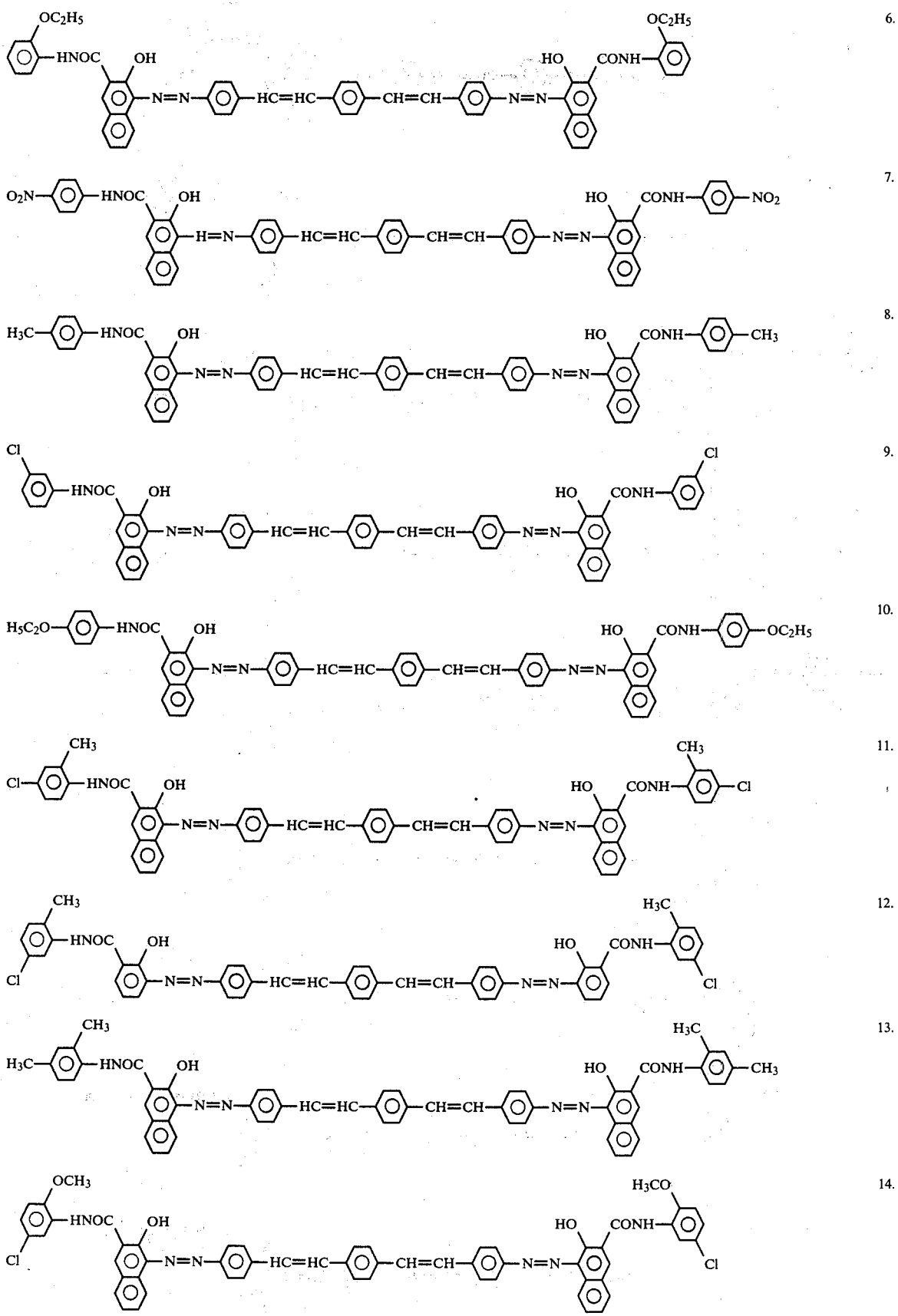

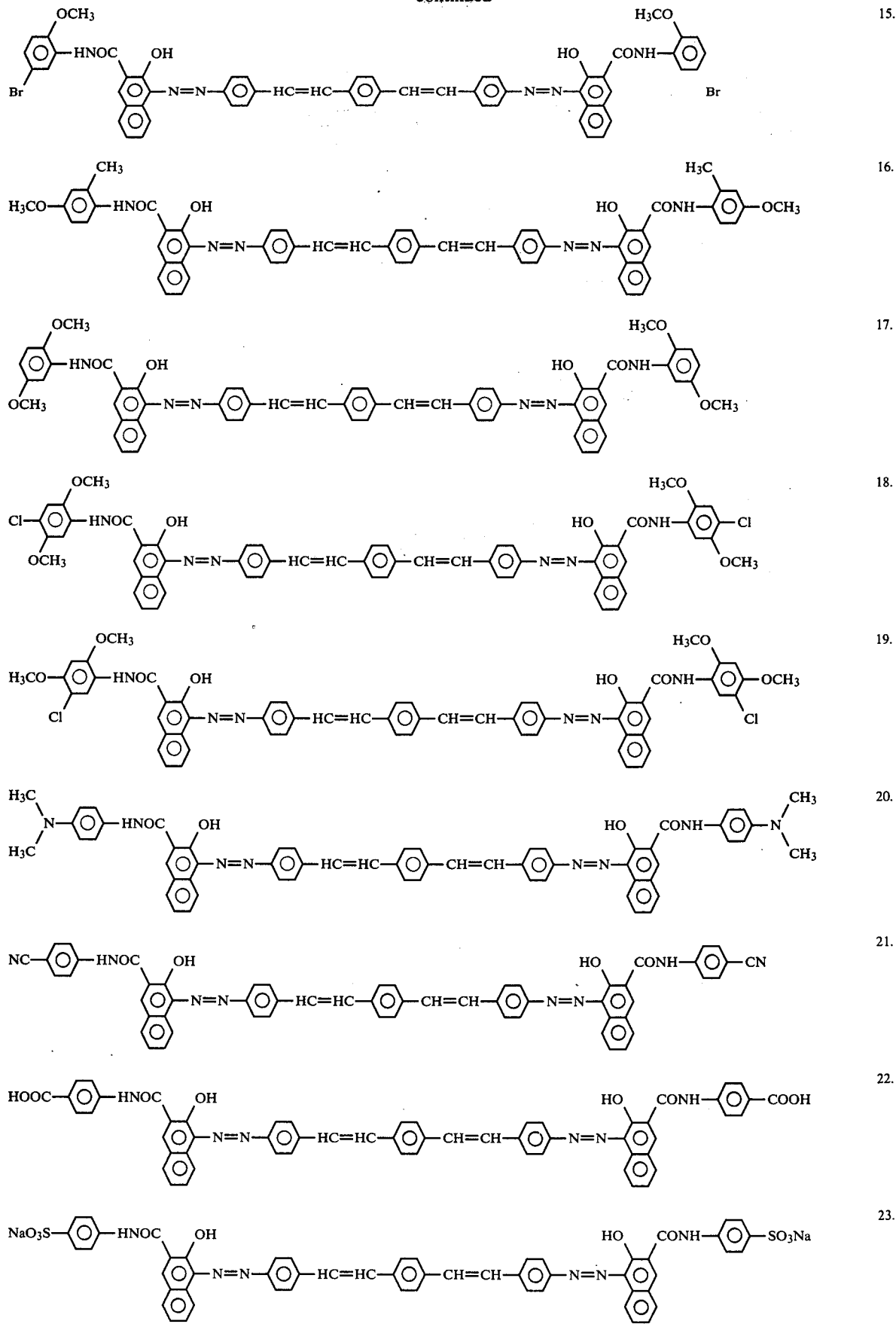

-continued
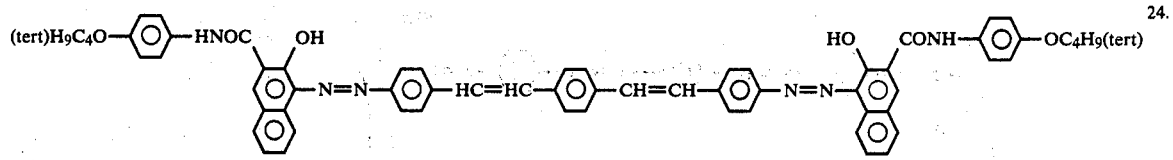
24.
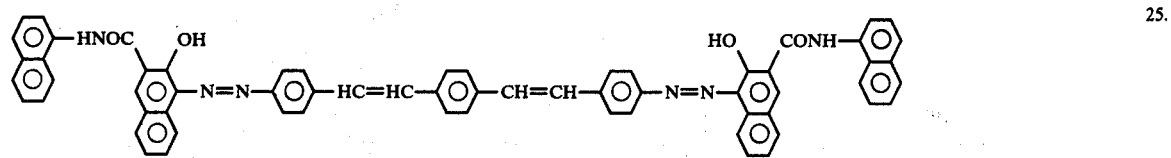
25.
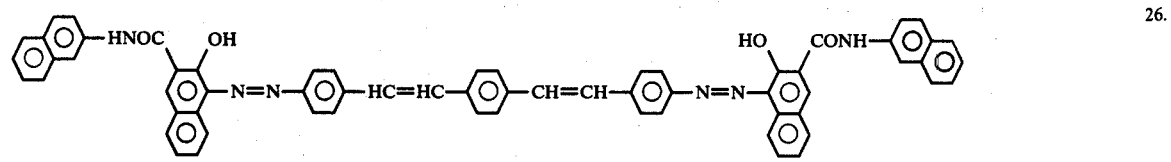
26.
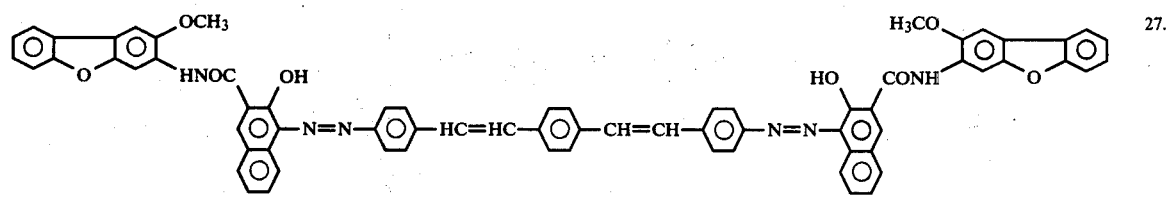
27.
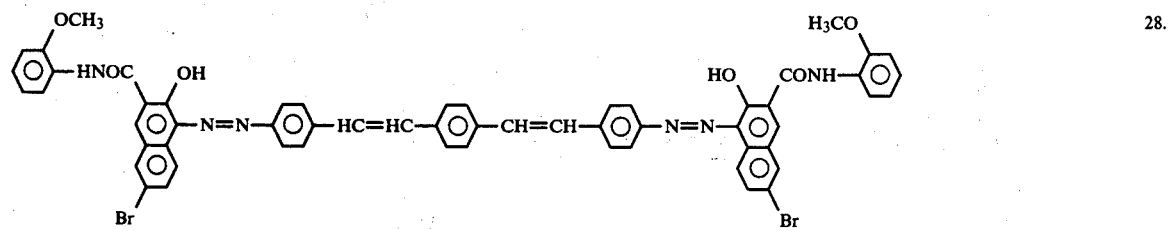
28.
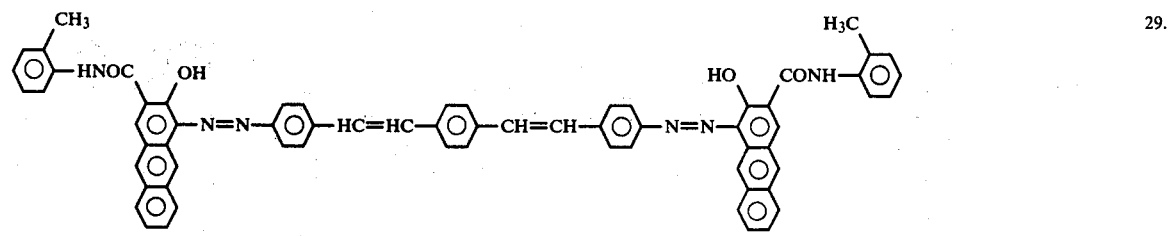
29.
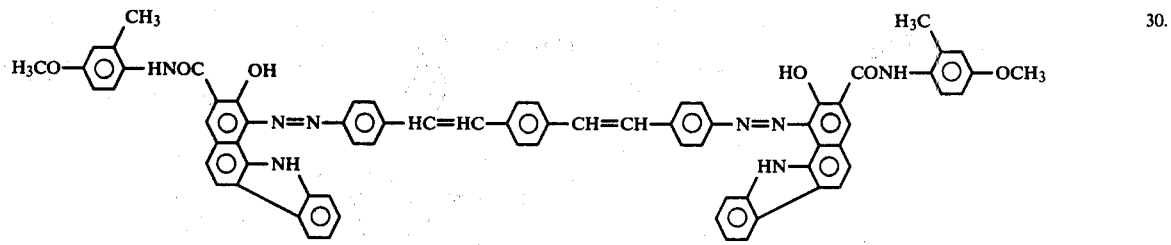
30.
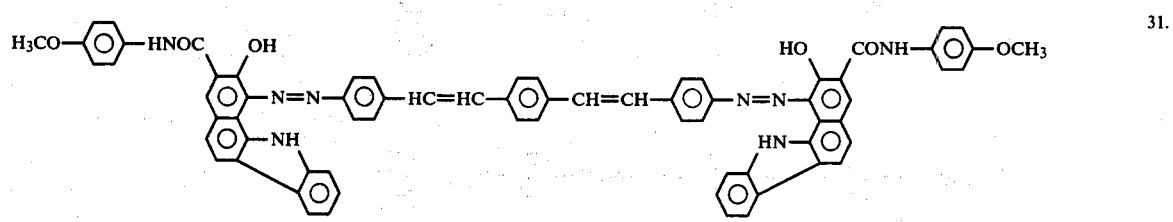
31.

-continued
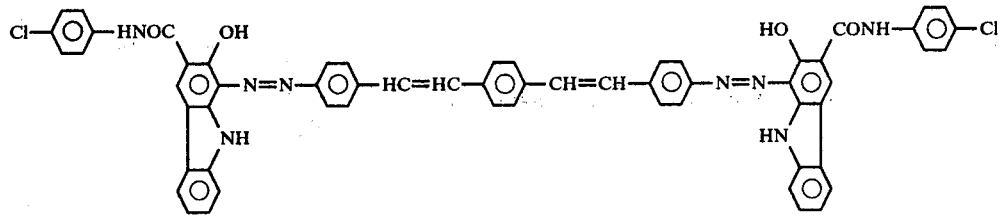
32.
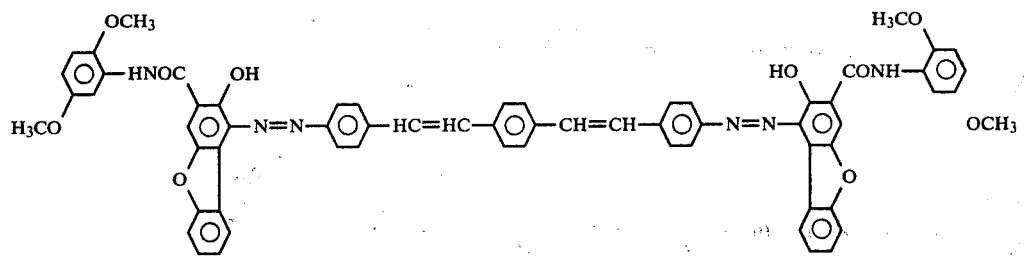
33.
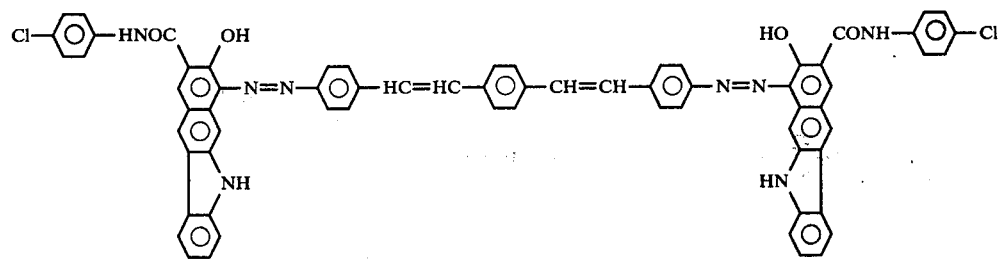
34.
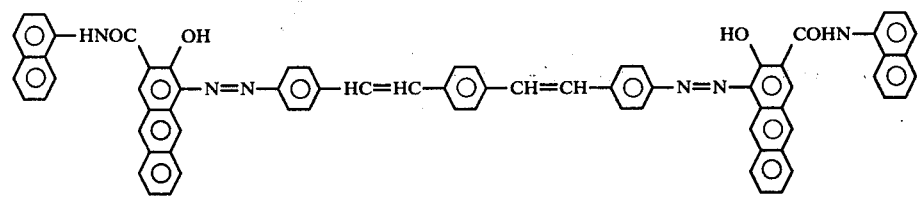
35.
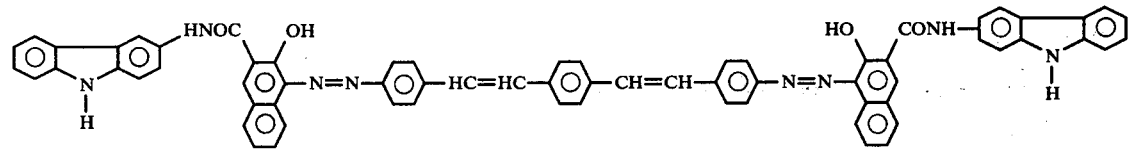
36.
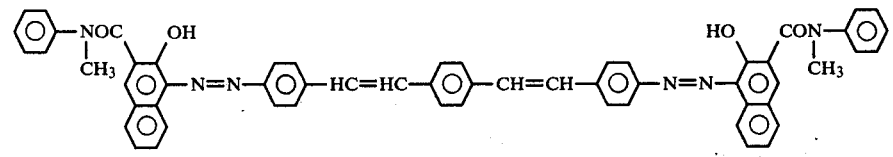
37.
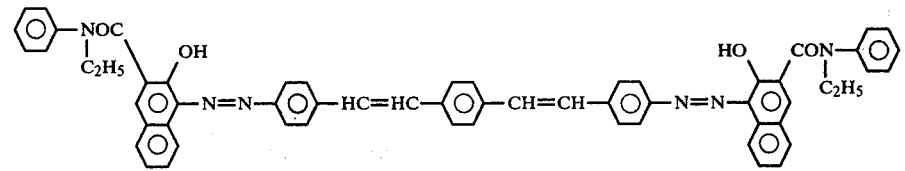
38.
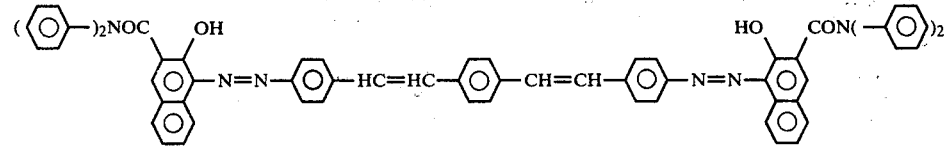
39.

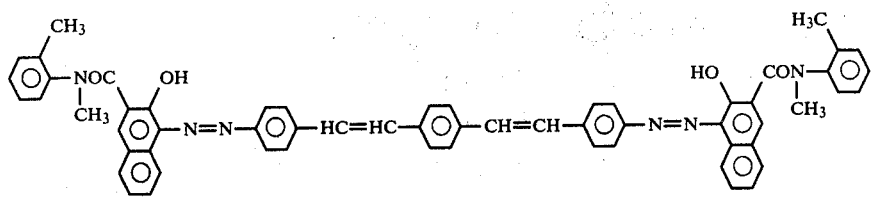
40.
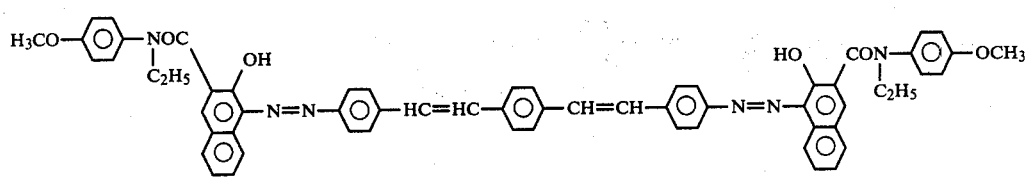
41.
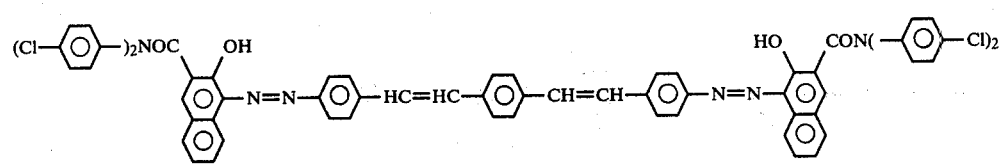
42.
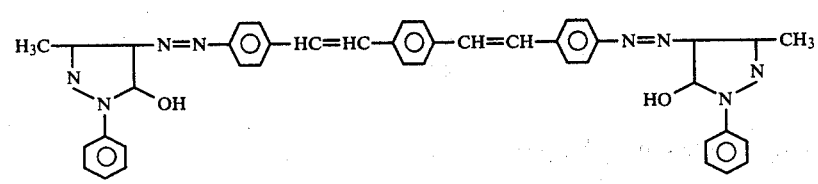
43.
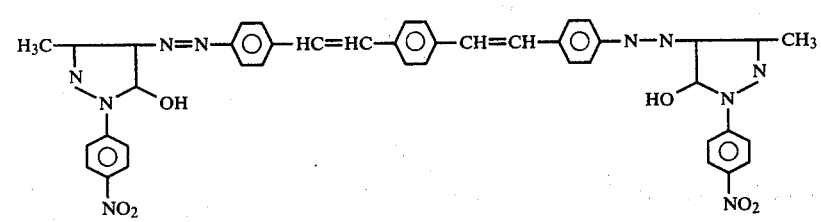
44.
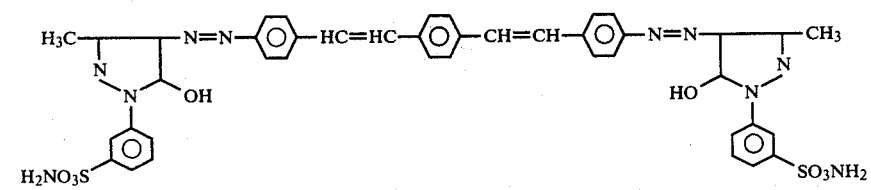
45.
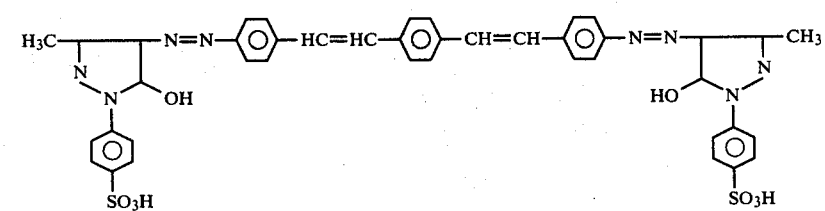
46.
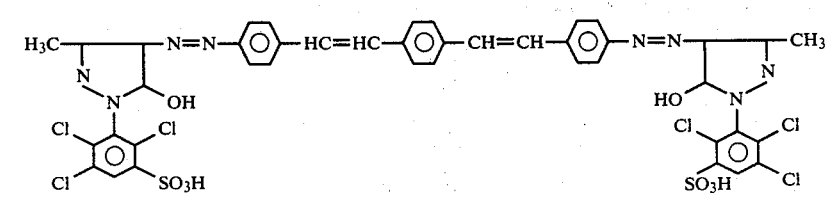
47.

-continued
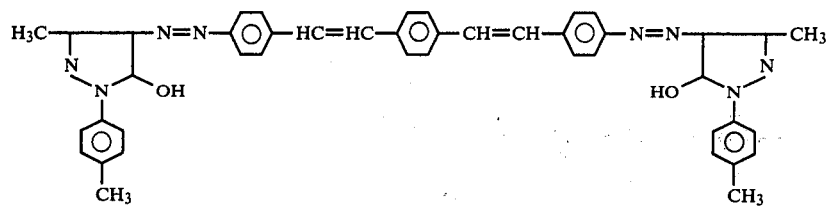
48.
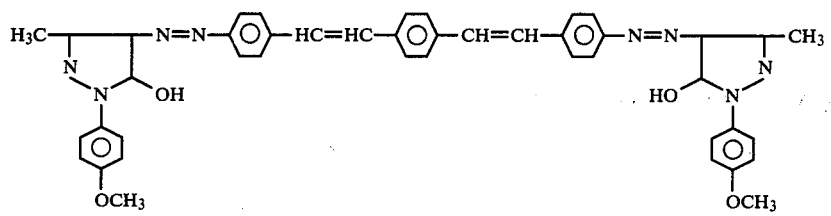
49.
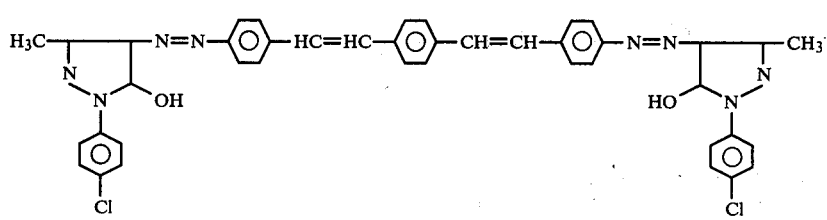
50.
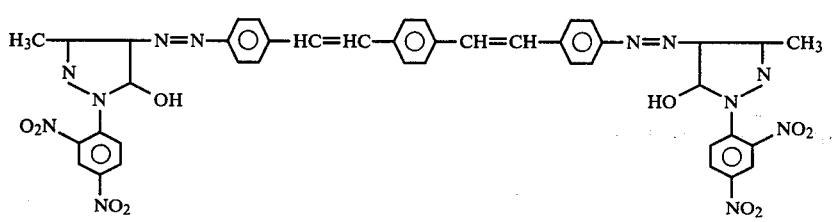
51.
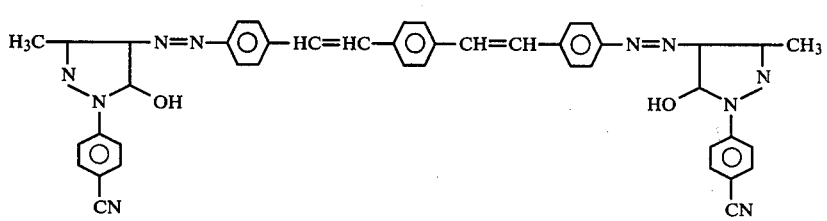
52.
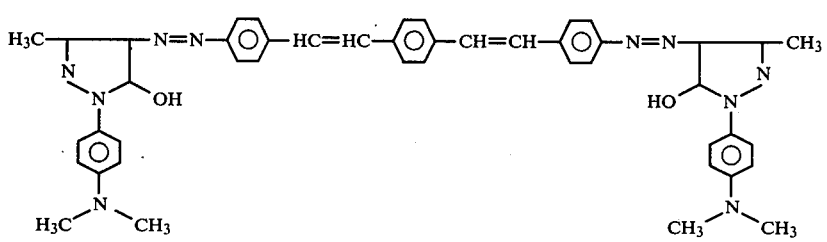
53.
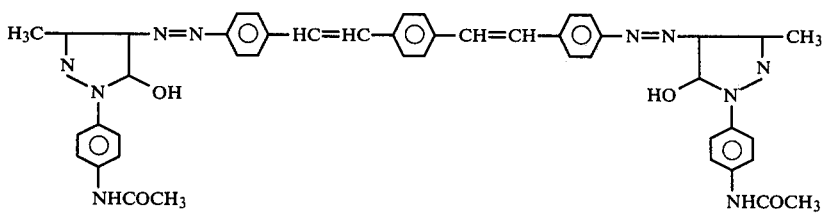
54.

-continued
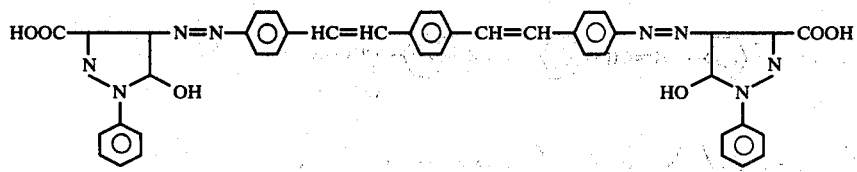
55.
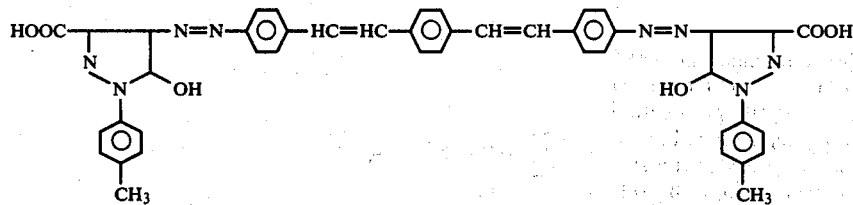
56.
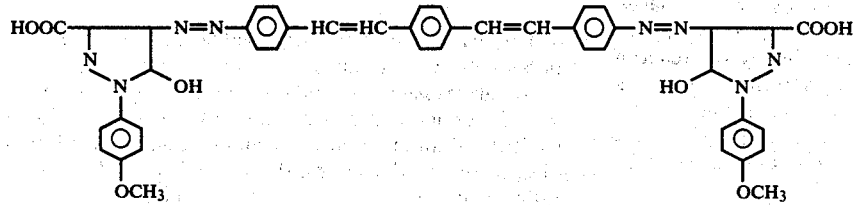
57.
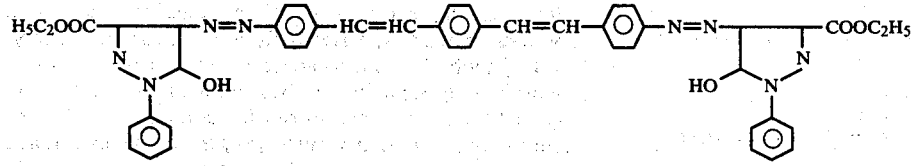
58.
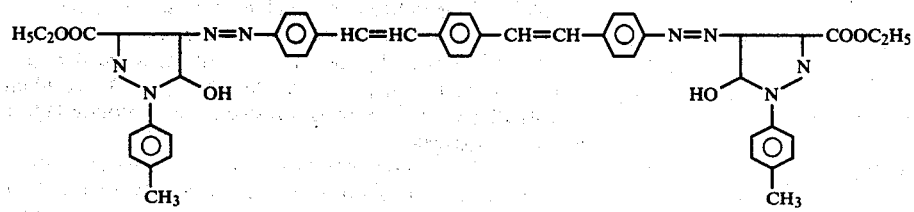
59.
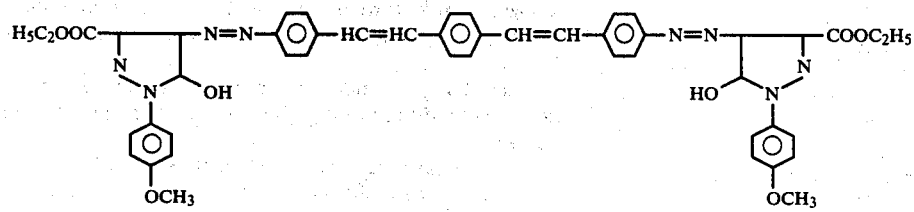
60.
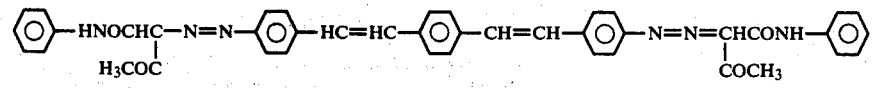
61.
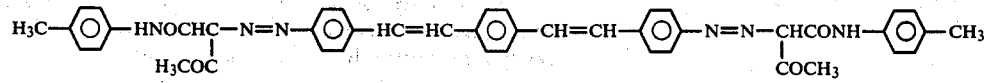
62.
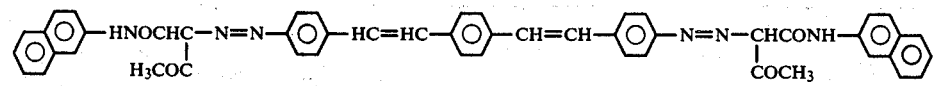
63.
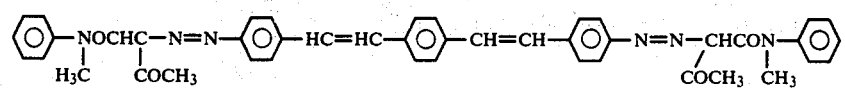
64.

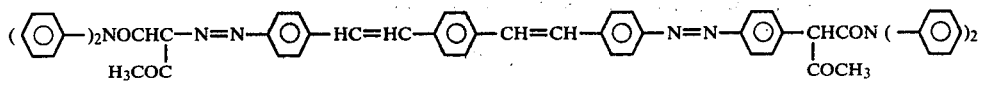

65.

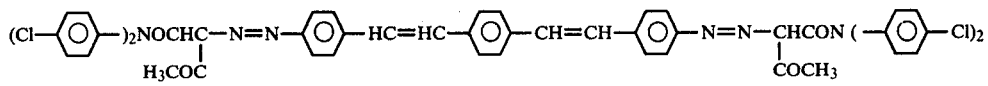

66.

When the above-mentioned disazo pigments are used, they are dissolved in an appropriate solvent together with a resin, such as polyvinyl butyral, polymethyl methacrylate, polyester, polyurethane, styrene-butadiene copolymer, polyvinyl toluene, polybutyl methacrylate, polyamide, or vinylidene cholride-vinyl chloride copolymer.

The charge-transfer materials for use in the charge-transfer layer, which were selected by forming their respective charge transport complexes by the reaction with 2,4,7-trinitro-9-fluorenone, confirming that the energy value corresponding to the wavelength of the maximum absorption in the visible absorption spectral of the respective complex were in the range of 1.6 to 2.1 eV;

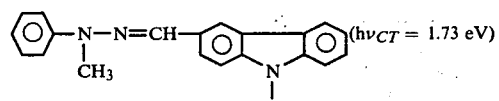

1.

9-methyl-3-formylcarbazole-1'-methyl-1'-phenylhydrazone

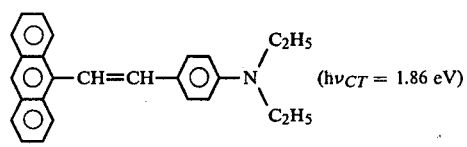

2.

9-(4-diethylaminostyryl-1)-anthracene

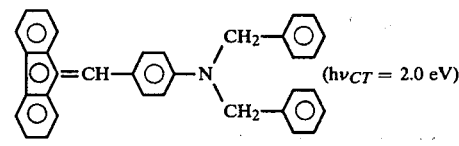

3.

9-(4-dibenzylaminobenzylidene-1)-fluorene.

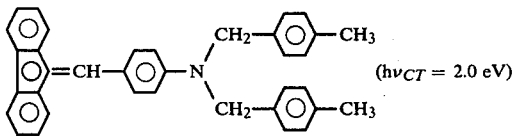

4.

9-{4-di(4-methylbenzyl)aminobenzylidene}-fluorene

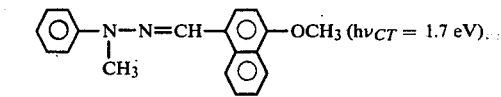

5.

4-methoxy-1-formylnaphthalene-1'-methyl-1'--phenylhydrazone

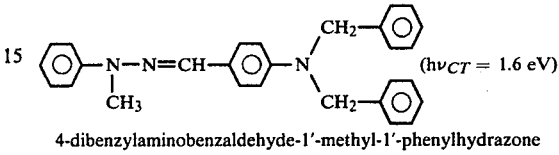

6.

4-dibenzylaminobenzaldehyde-1'-methyl-1'-phenylhydrazone

The respective light energy values $h\nu_{CT}$ in the above parentheses were obtained as follows: The charge-transfer complexes were formed by causing the above-mentioned six charge transport materials to react with 2,4,7-trinitro-9-fluorenone at a 1:1 molar ratio. The solution of each of the charge-transfer complexes and a binder resin, for example, polycarbonate was caused to flow on a quartz glass plate to form a film of each charge-transfer complex on the quartz glass plate. Each such film was subjected to spectral analysis using a spectral analyzer (Hitachi Spectral Analizer Model 3T) and the wavelength of the maximum absorption of visible light in each film of the charge-transfer complexes was measured and, from that wavelength, the above-mentioned light energy values were determined.

When the light energy value $h\nu_{CT}$ was smaller than 1.6 eV, it was found that the photoconductor was not charged sufficiently, on the other hand, when the light energy value $h\nu_{CT}$ was greater than 2.1 eV, residual potential tended to build up when the photoconductor was used repeatedly.

When the above-mentioned charge transport materials are used, they are dissolved in a solvent together with a resin, such as polycarbonate, polymethyl methacrylate, polystyrene, styrene-butadiene copolymer, polyvinyl butyral, polyester, polyvinyl toluene, polyurethane or nylon.

In the charge generation layer and the charge transport layer, ordinary additives and auxiliary agents can be used.

The present invention is further illustrated by was of the attached examples, but is not limited to the examples.

EXAMPLE 1

On an electroconductive support material comprising a polyester film on which aluminum was evaporated to a thickness of 650 A, a solution having the following compounds was coated and dried to form a charge generation layer with a thickness of 0.2μ:

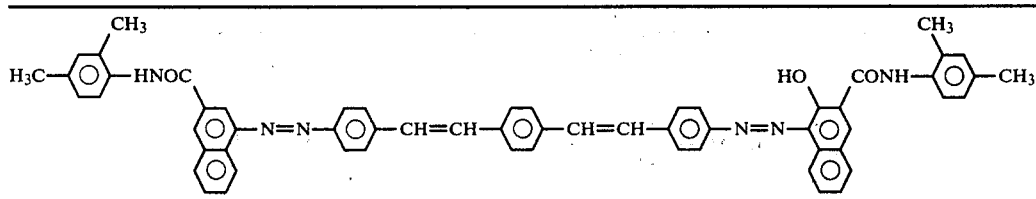

|  |  |
|---|---|
|  | 1 part by weight |
| Polyvinyl Buthyral | 0.15 part by weight |
| Polymethyl Methacrylate | 0.35 part by weight |
| Tetrahydrofuran | 10 parts by weight |

Then a solution having the following components was coated on the charge generation layer and dried to form a charge transport layer with a thickness of 15μ, whereby a layered electrophotographic photoconductor according to the present invention was prepared:

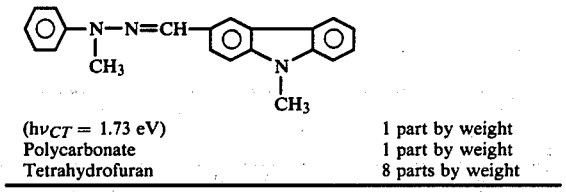

| | |
|---|---|
| ($h\nu_{CT} = 1.73$ eV) | 1 part by weight |
| Polycarbonate | 1 part by weight |
| Tetrahydrofuran | 8 parts by weight |

The thus prepared electrophotographic photoconductor was charged negatively in the dark under application of $-6$ kV of corona charge for 20 seconds and the surface potential Vs (Volt) of the photoconductor was measured by a Paper Analyzer (Kawaguchi Works, Model SP-428). The photoconductor was then allowed to stand in the dark for 20 seconds without applying any charge thereto, and the surface potential Vo (Volt) of the photoconductor was measured by the Paper Analyzer. The photoconductor was then illuminated by a tungsten lamp in such a manner that the illuminance on the illuminated surface of the photoconductor was 20 lux, so that the exposure $E_{\frac{1}{2}}$ (lux. second) required to reduce the initial surface potential Vo (Volt) to $\frac{1}{2}$ the initial surface potential Vo (Volt) was measured. The exposure $E_{1/10}$ (lux. second) required to reduce the initial surface potential Vo (Volt) to 1/10 the initial potential Vo was also measured.

Furthermore, at the first illumination (n=1) the residual potential $V_{30}$ (Volt) after 30 seconds of illumination was measured. The corona charge and illumination process was repeated 1,000 times and the residual potential was measured for the final illumination (n=1,000).

The results are shown in Table 1. With respect to the potential Vo, the ratio of Vo/Vs is shown in Table 1.

EXAMPLES 2 to 6

In Example 1, the charge transport materials 2 to 6 shown in Table 1 were employed instead of

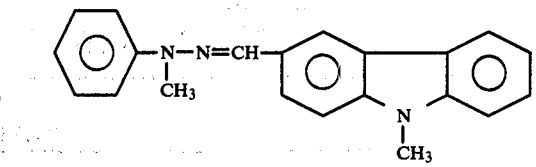

and the electrostatic characteristics of the respective electrophotographic photoconductor according to the present invention were measured under the conditions stated in Example 1. The results are shown in Table 1.

COMPARATIVE EXAMPLES 1 to 4

In order to illustrate the advantages of the present invention, instead of the charge transport material

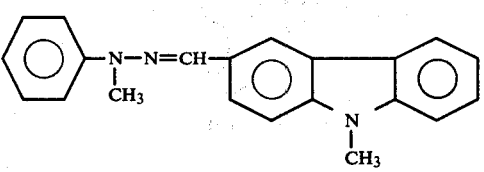

the compounds shown in Table 2 were used and electrophotographic photoconductors were prepared and their electrostatic characteristics were measured under the conditions stated in Example 1. The results are shown in Table 2.

TABLE 1

| Example | Charge transport materials | $h\nu_{CT}$ | Vs (Volt) | Vo/Vs | $E_{\frac{1}{2}}$ (lux. sec) | $E_{1/10}$ (lux. sec) | $V_{30}$, n = 1 | $V_{30}$, n = 1000 |
|---|---|---|---|---|---|---|---|---|
| Example 1 | (structure: phenyl-N(CH₃)-N=CH-carbazole) | 1.73 | −1160 | 0.90 | 1.4 | 3.4 | 0 | 0 |
| 2 | (structure: fluorene-CH=CH-phenyl-N(C₂H₅)₂) | 1.86 | −1080 | 0.79 | 1.7 | 4.4 | 0 | 0 |
| 3 | (structure: fluorene=CH-phenyl-N(CH₂-phenyl)₂) | 2.0 | −1100 | 0.80 | 1.9 | 4.6 | 0 | 0 |

TABLE 1-continued

| Example | Charge transport materials | $h\nu_{CT}$ | Vs (Volt) | Vo/Vs | E ½ (lux. sec) | E 1/10 (lux. sec) | $V_{30}$, n = 1 | $V_{30}$, n = 1000 |
|---|---|---|---|---|---|---|---|---|
| 4 | 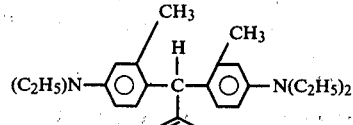 | 2.0 | −1211 | 0.78 | 1.8 | 4.6 | 0 | 0 |
| 5 | 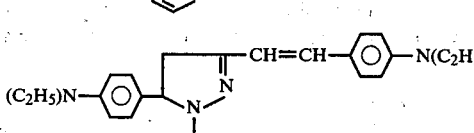 | 1.7 | −1300 | 0.78 | 2.2 | 5.1 | 0 | 0 |
| 6 | 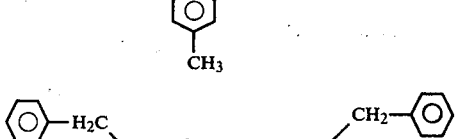 | 1.6 | −930 | 0.84 | 2.1 | 5.0 | 0 | 0 |

TABLE 2

| Example | Charge transport materials | $h\nu_{CT}$ | Vs (Volt) | Vo/Vs | E ½ (lux. sec) | E 1/10 (lux. sec) | $V_{30}$, n = 1 | $V_{30}$, n = 1000 |
|---|---|---|---|---|---|---|---|---|
| Comparative Example 1 | 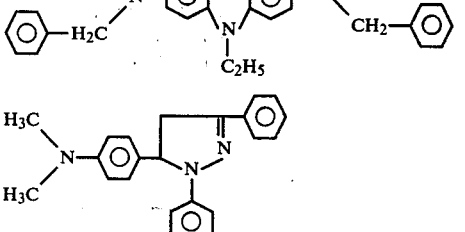 | 2.2 | −1170 | 0.88 | 1.9 | 3.7 | 10.7 | 60 |
| 2 | | 1.4 | −1030 | 0.70 | 2.0 | 4.9 | 0 | * |
| 3 | | 1.2 | −859 | 0.42 | 1.7 | 4.2 | 0 | * |
| 4 | | 2.25 | −1310 | 0.89 | 2.1 | 4.5 | 22.5 | 102 |

(Note)
* Since the photo conductor cannot be charged sufficiently when used in repetition, it was impossible to measure the surface potential.

As can be seen from Table 1 and Table 2, the electrophotographic photoconductors according to the present invention have a high photosensitivity and a small dark decay and are excellent in their retention of electric charges. Furthermore, the residual surface potential is low and does not build up while in repeated use.

What is claimed is:

1. In a layered electrophotographic photoconductor comprising an electroconductive support material and a photoconductive double layer which consists of a charge generation layer and a charge transport layer, the improvement comprising:

a. said charge generation layer comprises a disazo pigment selected from the group consisting of disazo pigments of the formula

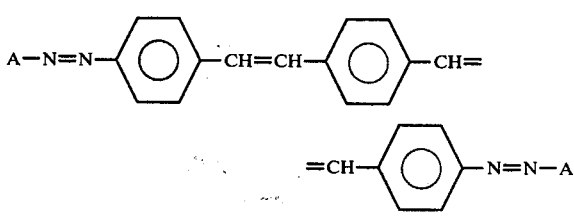

where A represents

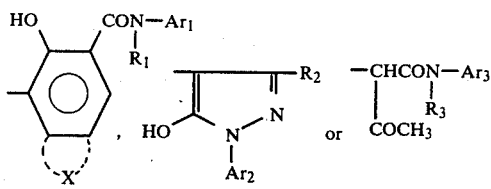

and X represents an aromatic ring, or a heterocyclic ring, or their substituted rings; $Ar_1$ represents an aromatic ring, or a heterocyclic ring, or their substituted rings; $Ar_2$ and $Ar_3$ each represent an aromatic ring, $R_1$ and $R_1$ each represent hydrogen, a lower alkyl group, a phenyl group or their substituted groups; and $R_2$ represents a lower alkyl group, a carboxyl group or its ester group, and b. said charge transport layer comprises a charge transport material capable of forming a charge-transfer complex by reaction with 2,4,7-trinitro-9-fluorenone, the light energy value corresponding to the wavelength of the maximum visible spectral absorption of said charge-transfer complex being in the range of 1.6 to 2.1 eV, and being selected from the group consisting of:

9-methyl-3-formylcarbazole-1'-methyl-1' phenylhydrazone,
9-(4-diethylaminostyryl-1)-anthracene,
9-(4-dibenzylaminobenzylidene-1)-fluorene,
9-{4-di-(4-methylbenzyl)aminobenzylidene}-fluorene,
4-methoxy-1-formylnaphthalene-1'-methyl-1'-phenylhydrazone, and
4-dibenzylaminobenzaldehyde-1'-methyl-1'-phenylhydrazone.

2. A layered electrophotographic photoconductor as claimed in claim 1, wherein said charge-transfer material is 9-methyl-3-formylcarbazole-1'-methyl-1'-phenylhydrazone.

3. A layered electrophotographic photoconductor as claimed in claim 1, wherein said charge-transfer material is 9-(4-diethylaminostyryl-1)-anthracene.

4. A layered electrophotographic photoconductor as claimed in claim 1, wherein said charge-transfer material is 9-(4-dibenzylaminobenzylidene-1)-fluorene.

5. A layered electrophotographic photoconductor as claimed in claim 1, wherein said charge-transfer material is 9-{4-di(4-methylbenzyl)aminobenzylidene}-fluorene.

6. A layered electrophotographic photoconductor as claimed in claim 1, wherein said charge-transfer material is 4-methoxyl-1-formylnaphthalene-1'-methyl-1'-phenylhydrazone.

7. A layered electrophotographic photoconductor as claimed in claim 1, wherein said charge-transfer material is 4-dibenzylaminobenzaldehyde-1'-metyl-1'-phenylhydrazone.

8. A layered electrophotographic photoconductor as claimed in claim 1, wherein said charge-transfer material is dispersed in a solvent together with a resin selected from the group consisting of polycarbonate, polymethyl methacrylate, polystyrene, styrene-butadiene copolymer, polyvinyl butyral, polyester, polyvinyl toluene, polyurethane and nylon.

* * * * *

UNITED STATES PATENT AND TRADEMARK OFFICE
CERTIFICATE OF CORRECTION

PATENT NO. : 4,284,698
DATED : AUGUST 18, 1981
INVENTOR(S) : TAKEO KAZAMI ET AL

It is certified that error appears in the above-identified patent and that said Letters Patent are hereby corrected as shown below:

In column 1, line 35, and in column 3, line 5:

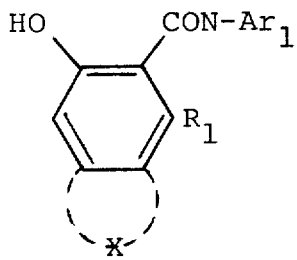

should read:

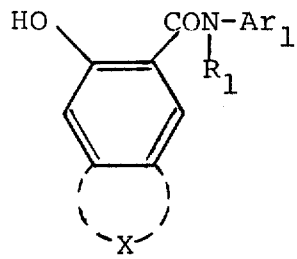

Signed and Sealed this

Eleventh Day of May 1982

[SEAL]

Attest:

Attesting Officer

GERALD J. MOSSINGHOFF
Commissioner of Patents and Trademarks